H. L. JOHNSTON.
REFINING MACHINE FOR COFFEE AND THE LIKE.
APPLICATION FILED APR. 30, 1910.
1,080,066.
Patented Dec. 2, 1913.
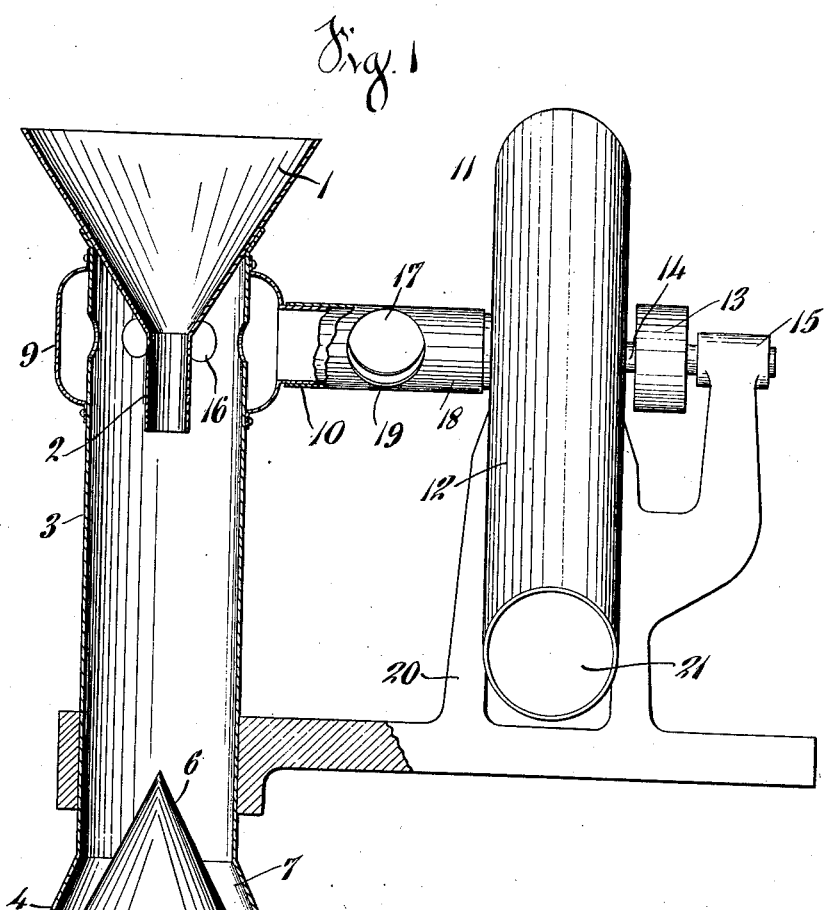
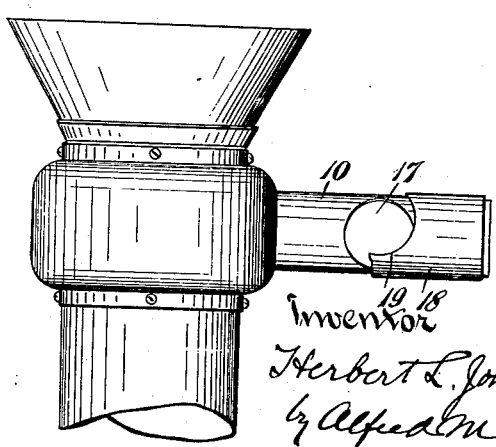

UNITED STATES PATENT OFFICE.

HERBERT L. JOHNSTON, OF TROY, OHIO, ASSIGNOR TO THE HOBART ELECTRIC MANUFACTURING COMPANY, OF TROY, OHIO, A CORPORATION OF OHIO.

REFINING-MACHINE FOR COFFEE AND THE LIKE.

1,080,066.  Specification of Letters Patent.  Patented Dec. 2, 1913.

Application filed April 30, 1910. Serial No. 558,617.

*To all whom it may concern:*

Be it known that I, HERBERT L. JOHNSTON, a citizen of the United States, and a resident of the city of Troy, in the county of Miami and State of Ohio, have invented certain new and useful Improvements in Refining-Machines for Coffee and the like, of which the following is a full, clear, and exact description, reference being had to the accompanying drawings, forming part of this specification.

The object of my invention is to provide a simple, cheap and effective apparatus for removing the chaff and dust from ground coffee, which will receive the coffee direct from the grinder, and the invention consists of that certain novel construction and arrangement of parts to be hereinafter particularly pointed out and claimed, whereby the ground coffee while passing through the apparatus may be effectually spread out and subjected to a uniform and evenly distributed air blast to separate the dust and chaff, and at the same time the blast of air may be properly regulated and controlled without disturbing the uniform suction of the exhaust blower.

In the drawings, Figure 1 is a central vertical section of my improved apparatus partly in elevation. Fig. 2 is a side elevation of a portion of the apparatus.

1 is a funnel with discharge spout 2 preferably mounted in vertical position to close the upper end of a cylindrical tube or conduit 3. The lower end of this conduit is provided with a flaring mouth 4, and inside of this flaring mouth is suitably secured a cone 5, the apex 6 of which extends into the central portion of the discharge end of the conduit. The inclination of the sides of the cone with reference to the flaring end of the conduit and the diameter of the cone are so designed that the annular passage 7 between the cone and flaring walls of the conduit is gradually restricted toward the outlet 8 from the conduit.

Surrounding the upper end of the conduit 3 is a chamber 9, which on one side is connected by the tube 10 with the exhaust blower 11, of which blower the casing 12 is alone illustrated, inasmuch as any desired construction of blower may be employed, the fans of which are driven by pulley 13 on spindle 14, the spindle being mounted in a suitable bearing 15. The construction of the blower and the method of driving same form no part of my invention.

A series of openings 16 are provided around the upper end of the conduit 3 into the chamber 9, and by preference the sum of the areas of these openings which are uniformly distributed around the chamber is equal to the cross sectional area of the tube 10. The tube 10 is provided with an opening 17 between the chamber 9 and the blower, and 18 is a sleeve loosely mounted on the tube 10 and provided with an opening 19 adapted to register with the opening 17, or by rotation of the sleeve to cut off and restrict the size of this outlet from the pipe 10. The various parts are mounted in any desired construction of standard 20 to properly support the operating parts.

The operation of the refiner will be evident from the foregoing description. The exhaust blower is started and the ground coffee is fed into the open funnel 1, if desired, direct from the mill. The coffee mixed with dust and chaff drops through the spout 2 and down through the tube 3, where it is subjected to the air blast created by the blower which draws the air in from the discharge end 8 of the conduit. As the chaff is lighter than the coffee, some of it will be entrained by the air current and carried with it to be discharged by the blower at 21. If there was only one opening at the upper end of the conduit, the tendency of the air entering below would be to take a direct angular path to the tube and therefore in order to cause the current of air to traverse a vertical path and to be distributed evenly about the walls of and through the conduit 3, I provide the chamber 9, and evenly distribute the openings 16 around the chamber, and to further provide for this even distribution of current, I make the openings of uniform size with a combined area equal to the cross sectional area of the tube 10. By this arrangement, the blower creates a partial vacuum in the upper end of the conduit which causes a practically uniform distribution of the air ascending through the conduit, so that it operates with uniform efficiency on all sides of the coffee in its descent. As the coffee falls through the conduit it strikes the apex of the cone 5 and is uniformly scattered over the sides of the cone, the force of the impact also serving to loosen the chaff which has a tendency to adhere to the coffee. The coffee falling over the cone to the annular discharge outlet also meets a current of air of increasing speed due to the gradual restriction of the outlet and the dust and chaff which has descended with the coffee is here caught up and carried upward out into the blower and is discharged while the refined coffee is caught in any convenient receptacle underneath the conduit 3. Should the force of the blast be insufficient to clean the coffee as much as desired, the opening 17 is restricted by rotating the sleeve 18, and which will thus, without changing the speed of the exhaust fans, force a large volume of air up through the conduit 3. The strength of the blast can thus be regulated as desired, and if too much finely ground coffee is taken off with the chaff by the blast, the user can adjust the amount of the suction to such compromise between amounts of chaff and fine coffee that are removed as may seem to him proper.

Having thus described my invention, what I claim as new and desire to secure by Letters Patent, is:

In a coffee refiner, a conduit through which the coffee is propelled by gravity, an exhaust blower to create an air blast through the conduit opposed to the movement of the coffee, the discharge end of the conduit being flared, and a cone located in the flared end with its apex projecting into the center of the conduit, and with the connection forming a narrow annular passage for the discharge end of the conduit, an annular chamber surrounding the upper end of the conduit with uniformly distributed openings into the conduit, and a tubular connection between the blower and conduit provided with an opening, and a sleeve mounted on the tubular connection, and provided with an opening to register with the tube opening, the sleeve being adapted to be moved on the tube to adjust the size of the tubular opening.

HERBERT L. JOHNSTON.

Attest:
W. W. Cope,
J. M. Spencer.